United States Patent
Janson et al.

(10) Patent No.: US 12,024,143 B2
(45) Date of Patent: Jul. 2, 2024

(54) BRAKE PEDAL MODULE

(71) Applicant: ZF Active Safety GmbH, Koblenz (DE)

(72) Inventors: Marcus Janson, Koblenz (DE); Christoph Beuerle, Koblenz (DE); Peter Polke, Hanroth (DE)

(73) Assignee: ZF Active Safety GmbH, Koblenz (DE)

( * ) Notice: Subject to any disclaimer, the term of this patent is extended or adjusted under 35 U.S.C. 154(b) by 0 days.

(21) Appl. No.: 17/868,306

(22) Filed: Jul. 19, 2022

(65) Prior Publication Data
US 2023/0033895 A1 Feb. 2, 2023

(30) Foreign Application Priority Data
Jul. 27, 2021 (DE) .......................... 102021119446.6

(51) Int. Cl.
*B60T 7/06* (2006.01)
*B60T 7/04* (2006.01)

(52) U.S. Cl.
CPC ............... *B60T 7/06* (2013.01); *B60T 7/042* (2013.01); *B60T 2220/04* (2013.01); *B60T 2270/82* (2013.01)

(58) Field of Classification Search
CPC ........ B60T 7/06; B60T 7/042; B60T 2220/04; B60T 2270/82; B60T 26/021; G05G 5/03; G05G 7/04; G05G 1/30
See application file for complete search history.

(56) References Cited

U.S. PATENT DOCUMENTS

| | | | | |
|---|---|---|---|---|
| 6,367,886 B1* | 4/2002 | Shaw | ..................... | B60T 8/4086 303/50 |
| 8,650,984 B2* | 2/2014 | O'Neill | ..................... | G05G 1/30 74/512 |
| 2001/0043009 A1* | 11/2001 | Anderson | ................ | G05G 5/03 303/3 |
| 2005/0082909 A1* | 4/2005 | Constantakis | ........ | B60T 8/3255 303/20 |
| 2010/0012442 A1* | 1/2010 | Koo | ......................... | G05G 5/03 188/72.9 |

FOREIGN PATENT DOCUMENTS

| | | | | |
|---|---|---|---|---|
| DE | 69515786 T2 | 7/2000 | | |
| DE | 69514360 T2 | 9/2000 | | |
| DE | 602004004471 T2 | 1/2008 | | |
| DE | 102020003809 A1 | 8/2020 | | |
| KR | 20080051321 A | * | 6/2008 | ............. B60T 7/042 |

* cited by examiner

*Primary Examiner* — Thomas C Diaz
(74) *Attorney, Agent, or Firm* — Kristin L. Murphy

(57) ABSTRACT

A brake pedal module for a brake-by-wire brake system of a vehicle is disclosed, having a carrier component for securing the brake pedal module on the vehicle, a brake pedal pivotably mounted on the carrier component, and a damping unit for producing a resistance during actuation of the brake pedal. The damping unit has an insert, which comprises at least one elastic element. A receptacle for the insert is formed on the carrier component, which receptacle forms a housing of the damping unit and into which the insert is inserted.

20 Claims, 2 Drawing Sheets

BRAKE PEDAL MODULE

CROSS-REFERENCE TO RELATED APPLICATION

This application claims priority to German Patent Application No. 102021119446.6, filed Jul. 27, 2021, the disclosure of which is incorporated herein by reference in its entirety.

TECHNICAL FIELD

The disclosure relates to a brake pedal module for a "brake-by-wire" brake system of a vehicle.

BACKGROUND

In the case of "brake-by-wire" brake systems, a braking intention of a driver is detected electronically, and the brakes of the vehicle are actuated by one or more purely electric actuators. For this purpose, provision can be made for each of the brakes of the individual wheels to be assigned an electric-motor actuator, as known, for example, in the case of an "EMB" (electric-motor brake). However, provision can also be made for an electrohydraulic actuator to be activated centrally in order to actuate the brakes hydraulically in a conventional manner, as known, for example, in an "IBS" (integrated brake system). Furthermore, a "brake-by-wire" brake system can be embodied as a hybrid system in that the brakes of one vehicle axle, for example those of the front wheels, are assigned to an "IBS" and the brakes of another vehicle axle, for example those of the rear wheels, are each embodied as an "EMB".

Since in "brake-by-wire" brake systems there is generally no mechanical connection between a brake pedal and the brakes, a reaction behaviour of the brake pedal is simulated, e.g. hydraulically, for the driver. More precisely, a greater resistance acts with increasing travel when the brake pedal is actuated.

Different pedal characteristics are usually desired for different brake systems of different vehicle models. The pedal characteristic designates a resistance which a driver perceives as a function of a braking travel when the brake pedal is actuated.

SUMMARY

What is needed is a brake pedal module in which various pedal characteristics can be achieved in a particularly simple manner.

According to the disclosure, a brake pedal module for a brake-by-wire brake system of a vehicle is disclosed. The brake pedal module comprises a carrier component for securing the brake pedal module on the vehicle, a brake pedal pivotably mounted on the carrier component, and a damping unit for producing a resistance during actuation of the brake pedal. The damping unit has an insert, which comprises at least one elastic element. A receptacle for the insert is formed on the carrier component and forms a housing of the damping unit and into which the insert is inserted.

The brake pedal module according to the disclosure has the advantage, on the one hand, that the insert can be designed according to the desired pedal characteristic, thus making it possible to achieve various pedal characteristics in a brake pedal module which is of identical construction externally. This has the advantage that many shared components can be used, thereby making possible particularly low production costs for the brake pedal module. According to the disclosure, it is only the insert that differs in brake pedal modules with different pedal characteristics.

Another advantage is that there is no separate housing for the damping unit, and this contributes to a simple construction of the brake pedal module.

According to one exemplary arrangement, an opening of the receptacle for the insertion of the insert is arranged on a rear side of the carrier component. For example, the rear side is that side of the carrier component which is directed away from the brake pedal and faces the dash panel. As a result, the opening is difficult to access as soon as the brake pedal module is mounted in a vehicle environment. In this way, manipulations of the brake pedal module are made more difficult.

The carrier component is usually secured on a bulkhead between the passenger compartment and the engine compartment. Thus, the brake pedal module would have to be removed to obtain access to the opening and thus to the insert.

For example, the opening is closed by a cover. In this case, the at least one elastic element of the insert can be supported on the cover.

Provision can furthermore be made for a further elastic element to be arranged on the cover, which, when the cover is secured, is arranged in the interior of the receptacle and which is part of the damping unit. The pedal characteristic is likewise influenced by the elastic element, specifically when a driver depresses the brake pedal almost completely. Since the further elastic element is arranged on the cover, different elastic elements can be secured on the cover, depending on the desired pedal characteristic, without the external geometry of the brake pedal module being affected.

The insert can comprise an actuating tappet, which is mechanically coupled to the brake pedal, wherein there is an aperture in the receptacle, through which the actuating tappet extends to the brake pedal. Thus, it is easy to connect the actuating tappet and the brake pedal mechanically to one another.

According to another exemplary arrangement, the opening of the receptacle for the insertion of the insert is arranged on a front side of the carrier component. This makes the opening more easily accessible, and it is therefore possible to exchange the insert even without removing the brake pedal module.

In this case, the aperture for the actuating tappet is correspondingly present in a cover which covers the opening on the front side.

In one exemplary arrangement, the insert is a pre-assembled unit. This makes the assembly of the brake pedal module particularly simple. The carrier component and the damping unit can be joined together in a single assembly step.

Alternatively, it is also conceivable for the individual parts of the damping unit to be inserted one after the other into the receptacle. In this case, however, significantly more assembly steps are required to join together the carrier component and the damping unit. Moreover, the insert can be assembled more easily outside the carrier component on account of the greater ease of access.

The insert additionally comprises a piston, on which the at least one elastic element is supported and which compresses the at least one elastic element when the brake pedal is actuated. As a result, the force necessary for compressing the at least one elastic element can be perceived by a driver as a resistance at the brake pedal. Moreover, the at least one elastic element serves as a restoring element for the piston and thus also for the brake pedal.

Screw lugs for securing the brake pedal module in a vehicle environment can be integrally formed on the carrier component. The brake pedal module can thus be mounted in a particularly simple manner, for example by two screw connections, in a vehicle environment.

In one exemplary arrangement, the damping unit is subjected to compression when the brake pedal is actuated. This enables the brake pedal module to be configured in a particularly compact way. More precisely, the damping unit can be arranged between the carrier component and the brake pedal when subjected to compression. In this case, the damping unit is arranged in the space which is present in any case between the carrier component and the brake pedal, in order to allow an actuating movement of the brake pedal.

According to one exemplary arrangement, the brake pedal module comprises a sensor unit for detecting a braking intention of a driver. In particular, a braking intention is detected electronically. Based on the detected braking intention, a signal can be forwarded to the actuators assigned to the wheels, which then generate a braking effect.

The brake pedal module is, for example, a pre-assembled structural unit which is self-contained in terms of forces. This achieves the advantage that the brake pedal module can be positioned particularly easily in an installation space environment. The components are held together in such a way that, apart from the securing of the structural unit on the vehicle, no additional mechanical support of some of these components on the vehicle is necessary owing to the structural unit being self-contained in terms of forces. Installation in the installation space is also simplified. Moreover, the brake pedal module can be of particularly compact design.

The brake pedal module according to the disclosure is suitable for use in a "brake-by-wire" brake system, which may be equipped with "EMB" brakes and/or is designed as an "IBS" system.

BRIEF DESCRIPTION OF DRAWINGS

Further advantages and features of the disclosure will become apparent from the following description and from the accompanying drawings, to which reference is made. In the drawings.

DETAILED DESCRIPTION

Figure 1:
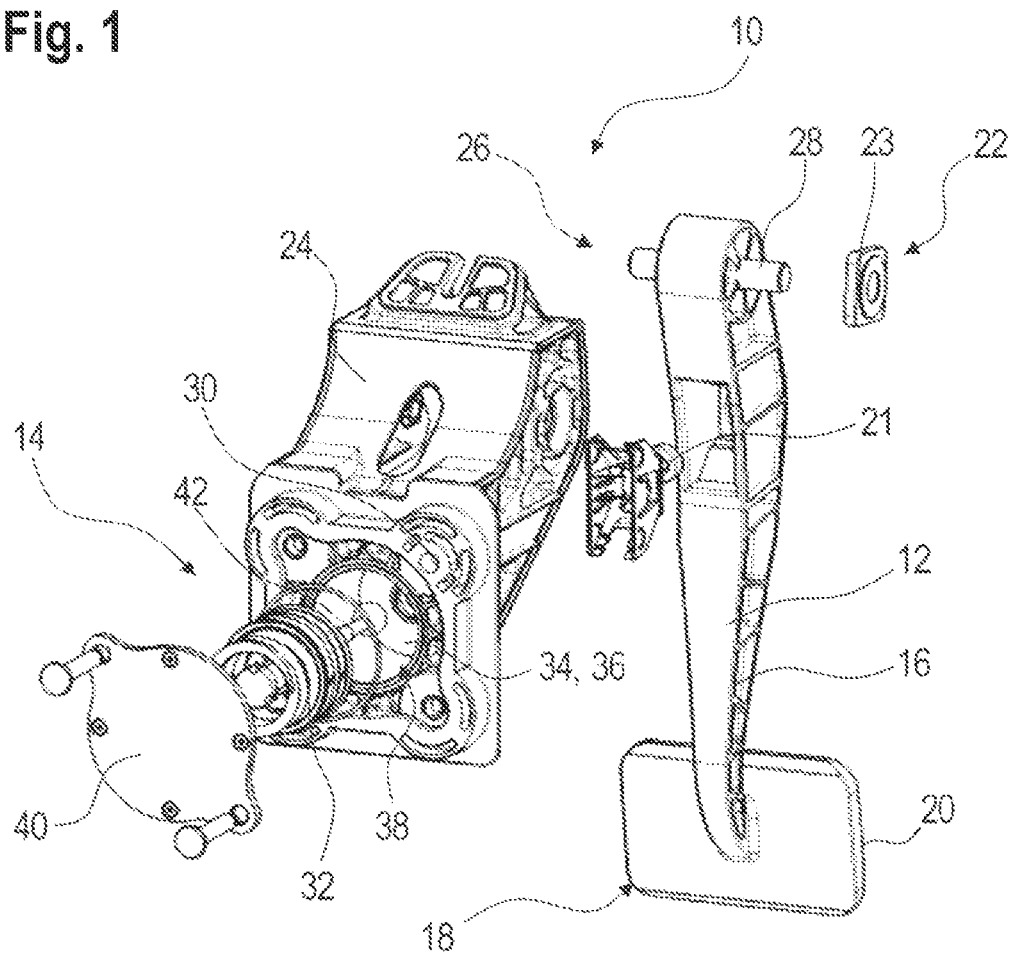
FIG. 1 shows a brake pedal module according to the disclosure in an exploded illustration.

FIG. 1 shows a brake pedal module 10 for a "brake-by-wire" brake system of a vehicle.

In one exemplary arrangement, the brake pedal module 10 serves to electronically detect a braking intention of a driver.

The brake pedal module 10 comprises a pivotably mounted brake pedal 12 and a damping unit 14, which is mechanically coupled to the brake pedal 12. More precisely, the damping unit 14 is coupled to the brake pedal 12 between the ends thereof.

The damping unit 14 is used to generate a resistance when the brake pedal 12 is actuated.

When the brake pedal 12 is actuated, the damping unit 14 is subjected to compression.

The brake pedal 12 is formed by a strut 16.

At a first end 18, the strut 16 has an actuating surface 20, which can be pressed by a driver to signal a braking intention. In other words, a driver can exert a pressure on the actuating surface 20 with the foot to signal a braking intention.

The brake pedal module 10 furthermore comprises a sensor unit 22 for detecting a braking intention of a driver.

In the exemplary arrangement, the sensor unit 22 comprises a force sensor 21 and an angle sensor 23.

The force sensor 21 is arranged on a rear side of the brake pedal 12.

The force sensor 23 is arranged on a suspension mount of the brake pedal 12.

The brake pedal module 10 furthermore has a carrier component 24, which is used to secure the brake pedal module 10 on the vehicle.

The other components of the brake pedal module 10 are pre-installed on the carrier component 24. This means that when the brake pedal module 10 is mounted in an installation space environment, only the carrier component 24 has be secured on the vehicle.

The brake pedal 12 is pivotably mounted on the carrier component 24, namely by an end 26 opposite the first end 18.

More precisely, the brake pedal 12 is mounted on the carrier component 24 in a pivot bearing 28.

In one exemplary arrangement, the carrier component 24 is formed in one piece, for example as an injection-moulded plastic part. However, a multi-part design is also conceivable.

The brake pedal module 10 is a pre-assembled structural unit which is self-contained in terms of forces. This means that the brake pedal module 10 represents an independent, functional unit which is mounted on the vehicle as a whole, more specifically via the carrier component 24. If the brake pedal is moved in the uninstalled state outside the vehicle, it is possible to carry out all of its movements which are also possible in the installed state because the structural unit is already self-contained beforehand in terms of forces. Consequently, the brake pedal module 10 can be arranged in an installation space environment in a particularly simple and flexible manner.

For easy fastening, screw lugs 30 are integrally formed on the carrier component 24.

The damping unit 14 has an insert 32. The insert 32 is inserted into a receptacle 34, which is formed on the carrier component 24 and forms a housing 36 of the damping unit 14.

Figure 3:
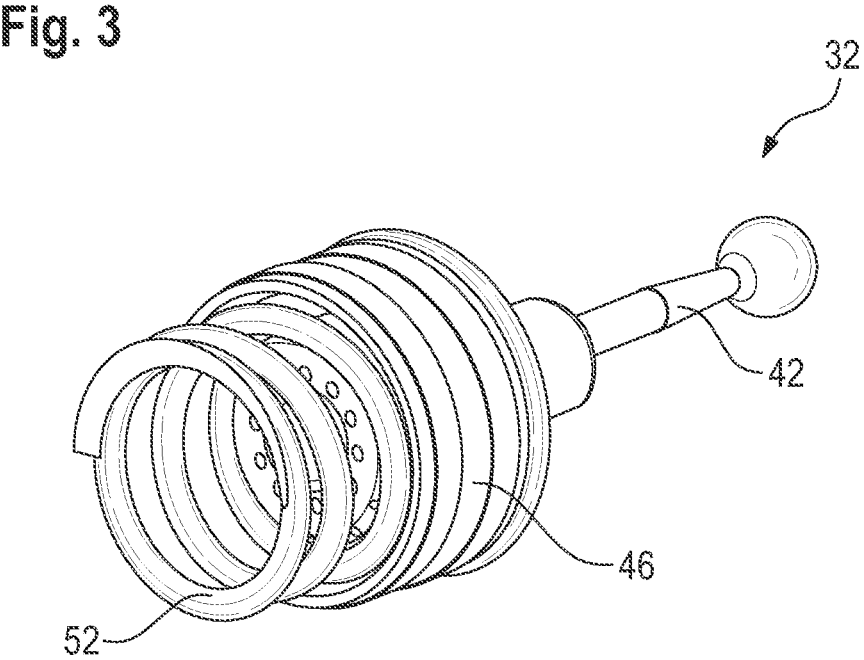
FIG. 3 shows an insert of the brake pedal module from FIG. 1.

The insert 32 is a pre-assembled unit, as can be seen in FIG. 1 and FIG. 3, which shows the insert 32 separately.

An opening 38 of the receptacle 34 is closed by a cover 40.

In the exemplary arrangement illustrated, the opening 38 is arranged on a rear side of the brake pedal module 10. In the installed condition of the brake pedal module 10 in a vehicle, the opening 38 and the cover 40 rest against a bulkhead, which separates the engine compartment from the passenger compartment.

The insert 32 comprises an actuating tappet 42, which is mechanically coupled to the brake pedal 12. To be more precise, the actuating tappet 42 is mounted in an articulated manner on the brake pedal 12 by an end remote from the damping unit 14, for example by a pivot joint or a ball-and-socket joint.

Figure 2:
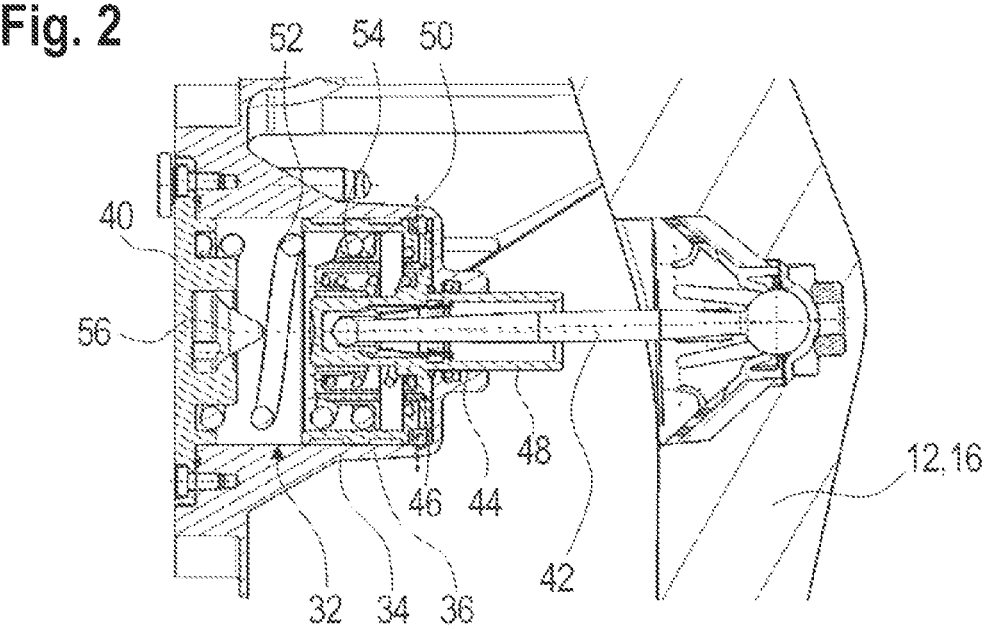
FIG. 2 shows part of the brake pedal module from FIG. 1 in a sectional illustration.

In the receptacle 34 there is an aperture 44, through which the actuating tappet 42 extends to the brake pedal 12 (see FIG. 2).

As can be seen in the sectional illustration in FIG. 2, the insert 32 furthermore comprises a piston 46. This is mounted movably in the housing 36 when the insert 32 is inserted into the receptacle 34.

The actuating tappet 42 is supported on the piston 46.

A piston rod 48, which likewise extends through the aperture 44 and in which a section of the actuating tappet 42 is accommodated, is integrally formed on the piston 46.

It is furthermore apparent from the sectional illustration in FIG. 2 that the insert 32 comprises two elastic elements 50, 52. The elastic elements 50, 52 are arranged in series.

The two elastic elements 50, 52 arranged in series are supported on one another via a supporting element 54.

To be more precise, the two elastic elements 50, 52 rest against opposite ends of the supporting element 54.

The piston 46 is supported on the elastic elements 50, 52. More precisely, the piston 46 is supported on the cover 40 via the elastic elements 50, 52.

When the brake pedal 12 is actuated, the piston 46 is moved in the housing 36 and compresses the elastic elements 50, 52.

The force which is necessary to compress the elastic elements 50, 52 is perceived by a driver as a resistance at the brake pedal.

The elastic elements 50, 52 also serve as restoring elements to move the piston 46 back into its initial position after actuation of the brake pedal 12.

In addition, a further elastic element 56 is arranged on the cover 40, which, when the cover 40 is secured, is arranged in the interior of the receptacle 34 and which is part of the damping unit 14.

The further elastic element 56 is arranged parallel to the two elastic elements 50, 52 arranged in series.

The elastic elements 50, 52 arranged in series are designed as helical springs, while the further elastic element on the cover 40 is a rubber damper.

According to another exemplary arrangement of the brake pedal module 10, the opening 38 of the receptacle 34 for the insertion of the insert 32 can be arranged on a front side of the carrier component 24.

In this case, the cover 40 is likewise located on the front side, thereby allowing the insert to be exchanged without the brake pedal module 10 having to be dismantled.

FIG. 2 shows, in dashed lines, a possible separation point between the receptacle 34 and the cover 40 according to the alternative arrangement.

The invention claimed is:

1. A brake pedal module for a brake-by-wire brake system of a vehicle, comprising a carrier component for securing the brake pedal module on the vehicle, a brake pedal pivotably mounted on the carrier component, and a damping unit for producing a resistance during actuation of the brake pedal, wherein the damping unit has an insert, which comprises a piston defining an annular groove around a first end, at least a first elastic element and a second elastic element arranged in series and supported on one another via a common supporting element that is disposed in the annular groove so as to be positioned about a portion of the first end of the piston, the first elastic element being disposed on one surface of the common supporting element and the second element being disposed against a different surface of the common supporting element; and wherein a receptacle for the insert is formed on the carrier component, which receptacle forms a housing of the damping unit and into which the insert is inserted.

2. The brake pedal module according to claim 1, wherein an opening of the receptacle for the insertion of the insert is arranged on a rear side of the carrier component.

3. The brake pedal module according to claim 2, wherein the opening is closed by a cover.

4. The brake pedal module according to claim 3, wherein a further elastic element is arranged on the cover, which, when the cover is secured, is arranged in an interior of the receptacle and parallel to the first and second elastic elements, the further elastic element being part of the damping unit.

5. The brake pedal module according to claim 1, wherein the insert comprises an actuating tappet, which is mechanically coupled to the brake pedal.

6. The brake pedal module according to claim 1, wherein an opening of the receptacle for the insertion of the insert is arranged on a front side of the carrier component.

7. The brake pedal module according to claim 1, wherein the insert is a pre-assembled unit.

8. The brake pedal module according to claim 1, wherein the insert comprises a piston, on which the first elastic element is at least partially supported and which compresses the first elastic element when the brake pedal is actuated.

9. The brake pedal module according to claim 1, wherein screw lugs for fastening the brake pedal module in a vehicle environment are integrally formed on the carrier component.

10. The brake pedal module according to claim 1, wherein the damping unit is subjected to compression when the brake pedal is actuated.

11. The brake pedal module according to claim 1, wherein the brake pedal module comprises a sensor unit for detecting a braking intention of a driver.

12. The brake pedal module according to claim 1, wherein the brake pedal module is a structural unit which is self-contained in terms of forces.

13. The brake pedal module according to claim 5, wherein there is an aperture in the receptacle, through which the actuating tappet extends to the brake pedal.

14. The brake pedal module according to claim 4, wherein the insert comprises an actuating tappet, which is mechanically coupled to the brake pedal, wherein there is an aperture in the receptacle, through which the actuating tappet extends to the brake pedal.

15. The brake pedal module according to claim 14, wherein the insert is a pre-assembled unit.

16. The brake pedal module according to claim 3, wherein the insert comprises a piston, on which the at least one elastic element is supported and which compresses the at least one elastic element when the brake pedal is actuated.

17. The brake pedal module according to claim 16, wherein screw lugs for fastening the brake pedal module in a vehicle environment are integrally formed on the carrier component.

18. The brake pedal module according to claim 16, wherein the brake pedal module comprises a sensor unit for detecting a braking intention of a driver.

19. The brake pedal module according to claim 16, wherein the brake pedal module-is a structural unit which is self-contained in terms of forces.

20. A brake pedal module for a brake-by-wire brake system of a vehicle, comprising a carrier component for securing the brake pedal module on the vehicle, a brake pedal pivotably mounted on the carrier component, and a damping unit for producing a resistance during actuation of the brake pedal, wherein the damping unit has an insert, which comprises at least a first elastic element and a second elastic element arranged in series and supported on one another via a supporting element, the supporting element configured as a sleeve element having an annular mounting channel and a mounting surface external to the annular mounting channel, wherein the first elastic element is disposed within the annular mounting channel and the second elastic element is disposed against the mounting surface of the supporting element and wherein a receptacle for the insert is formed on the carrier component, which receptacle forms a housing of the damping unit and into which the insert is inserted.

* * * * *